Jan. 30, 1962  W. T. RENTSCHLER  3,018,710
PHOTOGRAPHIC CAMERA
Filed March 5, 1959  3 Sheets-Sheet 1

INVENTOR.
Waldemar T. Rentschler
BY
Munn, Liddy, Daniels & March
ATTORNEYS

Jan. 30, 1962  W. T. RENTSCHLER  3,018,710
PHOTOGRAPHIC CAMERA
Filed March 5, 1959  3 Sheets-Sheet 2
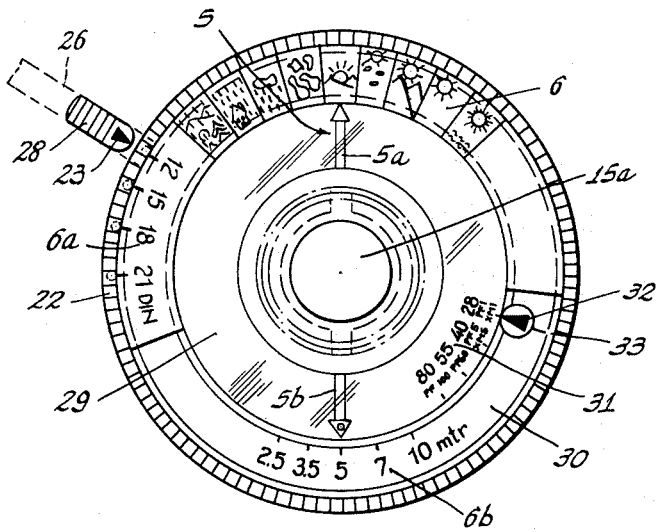
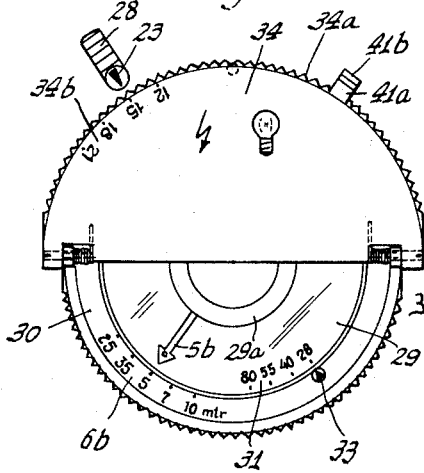
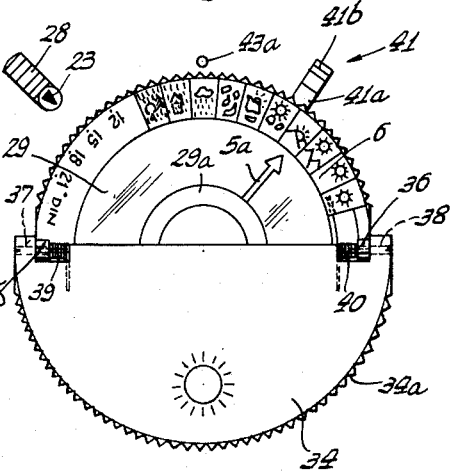
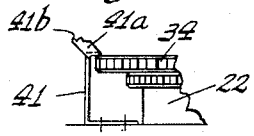
INVENTOR.
Waldemar T. Rentschler
BY
Munn, Liddy, Daniels & March
ATTORNEYS Jan. 30, 1962  W. T. RENTSCHLER  3,018,710
PHOTOGRAPHIC CAMERA
Filed March 5, 1959  3 Sheets-Sheet 3
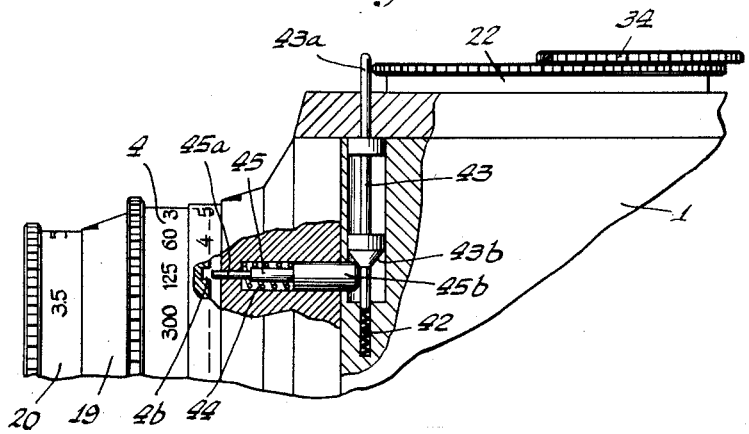
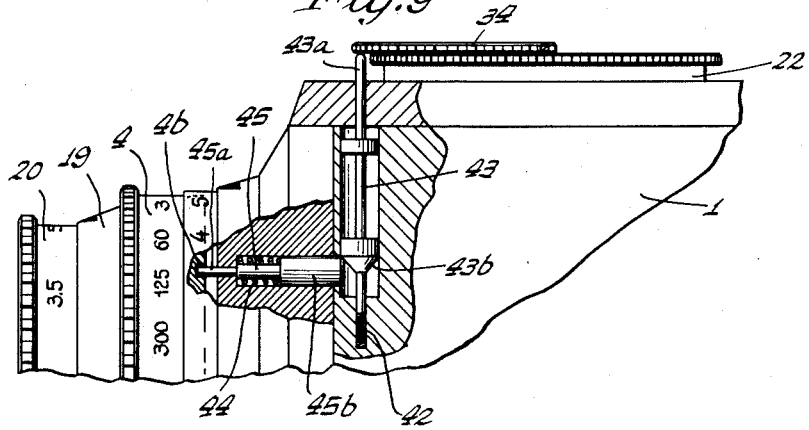
INVENTOR.
Waldemar T. Rentschler
BY
Munn, Liddy, Daniels & March
ATTORNEYS

United States Patent Office 3,018,710
Patented Jan. 30, 1962

3,018,710
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed Mar. 5, 1959, Ser. No. 797,368
Claims priority, application Germany May 6, 1958
7 Claims. (Cl. 95—64)

This invention relates to photographic cameras of the type wherein the settings for different exposures are made with reference to certain exposure symbols.

In general two different types of such setting systems are known in cameras of the above-mentioned kind. In one system the setting of the speed and diaphragm is effected utilizing an exposure table wherein the various kinds of brightness or exposure intensities are expressed by different exposure symbols. Related to these exposure symbols for the purpose of ascertaining the proper speed-aperture combination suitable for the existing light conditions is either an exposure-value scale or a plurality of paired speed-diaphragm values, one for each exposure symbol.

It has been found, however, that this type of speed setting device has a number of disadvantages. What is intended to be a readily understandable and simple method of determining the exposure by means of a plurality of exposure symbols becomes a complicated and time-wasting procedure because of the necessary revaluation of the symbols into numbers and the transferring of the said numbers to the setting devices for speed and diaphragm. Such procedure becomes quite involved and results in a difficult-to-understand handling of the camera, wherein many mistakes are apt to occur, thereby resulting in a distinct disadvantage to the operator when he or she prepares to ready the camera for an exposure.

In the other type of known setting system an exposure-symbol scale is fixed directly to the exposure setting device, in place of the usual exposure scale. Such arrangement is generally employed in cameras of simple construction and moderate cost, which are intended to operate with a constant speed shutter, the only adjustment being that of the diaphragm to meet the various, existing light conditions. While the handling of such a camera is relatively simple, it is at the expense of considerably limiting the field of application.

In contrast to the above systems, the invention provides an improved and simplified photographic camera of the type wherein symbols are used for setting purposes, said camera however providing for the setting of both speed and diaphragm in accordance with the existing light conditions so as to not limit its field of application, while at the same time enabling an uncomplicated, clear and rapid adjustment to be made just as with cameras having coupled exposure meters. However, the present camera is free of the disadvantages of a built-in exposure meter, especially as regards the requirements of space, the defects in operation and higher cost, which latter inevitably requires the camera to be sold at a higher list price.

In accordance with the invention the above object is solved by the provision of a follow-up type of control or transmission device of well known construction, said device being actuated in response to the setting movement of the diaphragm and/or speed setting member of the camera and having a link or indicator which is preferably arranged on the upper side of the camera housing, cooperating with a scale on which there is provided a number of exposure symbols.

The arrangement provided by the invention is characterized by a simple and compact construction as well as by absolute reliability of operation, by virtue of there being a maximum of operational simplicity of the kind normally only obtained with well-known cameras having built-in, coupled exposure meters. With respect to these well known cameras, however, the camera of the present invention has the advantage that it is free from any extensive requirements of space and is much less costly than a camera having a setting means of the built-in, coupled exposure meter type. At the same time, it is trouble-free in its operation, so that the operator is not likely to make mistakes in setting the camera. The favorable factors relating to the saving of space and decrease in cost is enhanced by the surprising fact that a camera of the type having a coupled exposure meter can be readily transformed into the camera as provided by the invention, without involving an apreciable additional expense and without requiring extra space to any extent, which would otherwise result in difficulty in effecting such a conversion. Thus it is seen that from the foregoing there may be obtained a camera which is characterized by extreme ease of operation with regard to both the focusing as well as the setting of speed, this being possible while at the same time the price of manufacture is reduced to a value lower than was heretofore possible.

The arrangement of the follow-up link or indicating pointer and the scale composed of the exposure symbols, as provided on the upper side or wall of the camera, provides the significant advantage that the setting of the camera may be easily and quickly carried out, with a minimum of inconvenience. In the illustrated embodiment of the invention there is had the further advantage that the said top wall may be completely closed, this being accomplished by disposing the follow-up link or indicator and its control mechanism in a well known manner completely inside of the camera housing.

Further, in accordance with the invention, the present simplified setting device may be advantageously utilized and adapted for the making of flashlight exposures in an unusual and advantageous manner, in addition to functioning for the setting of the camera to take daylight pictures.

In accordance with the invention this is accomplished by the provision in addition to the exposure symbol scale, of an auxiliary scale having data on it for focusing the camera, said auxiliary scale being adapted for cooperation with the follow-up link or pointer and enabling a diaphragm setting of the camera to be effected for the taking of flashlight pictures.

By such organization there is obtained the advantage that without additional expense the setting of the diaphragm for flashlight exposures can be made in the same easy, simple and advantageous manner which characterizes the setting means provided by the invention for effecting speed and diaphragm settings suitable for daylight exposures.

By such arrangement the operator is relieved of any mental work which would otherwise be required, for the purpose of mathematically ascertaining the diaphragm factor resulting from the guide number of the flash lamp type or electronic flash device utilized, in conjunction with the distance to the object which is to be photographed, and thus there is avided any possibility of error in calculations which might result in wrong exposures.

There is also provided a simple arrangement which increases the clarity and ease of setting of the camera, embracing the provision of a covering or cover member which can be moved between two positions and which is associated with the exposure symbol scale and the auxiliary focusing scale. The said cover member is so constituted that in one of its positions it covers and hides the exposure symbol scale, while in the other of its positions it covers the auxiliary focusing scale. By the provision of the said cover member or device there is eliminated the possibility of potential error on the part of the operator, which might result in confusion and utilization of the wrong scale. Further, the cover member as provided simplifies the operation of setting the camera and provides the maximum degree of reliability, in effecting the proper exposures.

In the figures of the accompanying drawings, the invention is shown by means of an embodiment which discloses a camera of the type having an intra-lens shutter.

FIG. 1 is a view partly in top plan and partly in schematic representation of a photographic camera as provided by the invention, having an intra-lens shutter mounted on the front wall of the camera. The shutter is of the type having an adjustable front lens and speed and diaphragm setting devices which, in accordance with the invention, are coupled to a pointer or tracing member which is mounted on the upper wall of the camera and which cooperates with a symbol scale.

FIG. 4 is a top plan view of the tracing member or pointer as indicated in FIGS. 1 and 2, and of the carrier ring with the scales provided on it.

Figure 1:
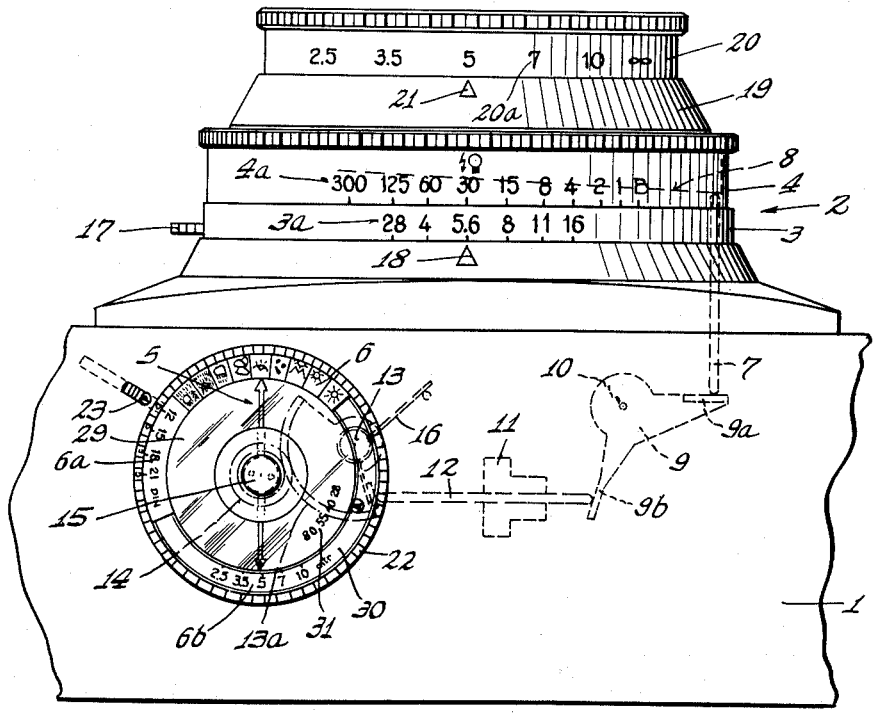

FIG. 5 shows a further development of the invention involving the structures of FIGS. 1 and 4, illustrating in top plan view a cover plate or flap which is mounted on the carrier ring having the setting scales, for the purpose of covering or hiding either the exposure symbol scale or an auxiliary focusing scale. In the figure the cover flap is shown in the position which conceals the exposure symbol scale, thereby revealing the other scale which is to be utilized for flashlight exposures.

FIG. 6 is a view like FIG. 5 but showing the cover flap in the position where the flashlight scale is covered and the symbol scale is uncovered for the purpose of making daylight exposures.

FIG. 7 is a fragmentary side elevational view of a locking device provided for the cover flap of FIGS. 5 and 6.

FIG. 8 is a view partly in section and partly in side elevation, of a control device which cooperates with the speed setting member of the shutter, to control the positioning of the cover flap. As illustrated in FIG. 8 the control device is in the blocking position wherein it prevents the cover flap from being locked in the position required to effect camera settings suitable for flash exposures. The control device as shown operates to permit the locking device of FIG. 7 to be effective to lock the cover flap in position for setting the camera for flash exposures only when the speed setting member of the shutter is properly positioned to adjust the camera for flashlight exposures.

FIG. 9 is a view like that of FIG. 8 but showing the cover flap held in the position desired for the taking of flashlight exposures, the speed setting member of the shutter being arrested by the control device in the position where the camera is set for executing flash pictures.

Referring to FIGS. 1, 2, 8 and 9, the housing of the photographic camera is indicated by the numeral 1. As seen in FIG. 1 a photographic intra-lens shutter assembly 2 is mounted in a well-known manner on the front wall of the camera housing 1.

In accordance with the present invention, a follow-up control or transmission device of a well-known type is arranged in the camera housing 1, said transmission being actuated in response to the movement of the diaphragm and speed setting rings 3 and 4 respectively and effecting in response to its actuation a positioning of a tracing member or pointer which is mounted on the upper part or wall of the camera housing 1 and indicated by the numeral 5. The pointer 5 cooperates with a scale 6, which latter is constituted of a number of different exposure symbols.

The follow-up control or transmission device includes an axially movable pin 7 which is mounted in the camera housing 1 and arranged to engage and be actuated by either the diaphragm setting ring 3 or the speed setting ring 4, by means of a control cam 8 engaging one end of the transmission pin 7. Thus, by turning one of the rings 3 or 4 the pin 7 is shifted axially in a direction which is parallel to the optical axis of the camera or shutter. In FIG. 1 the control cam 8 is indicated by a broken line, said cam being carried by a ring which is not illustrated herein in detail but is arranged to extend around the circumference of the shutter. The connection or coupling between the ring having the control cam 8 and the setting rings 3 and 4 for diaphragm and speed respectively can be made in various ways. For example, the connection could be carried out in a manner as described and claimed in my copending application Ser. No. 706,023. Or, for example, the ring which has the control cam 8 might be constituted as a differential ring of a well-known toothed differential transmission.

The transmission of the axial motion of the pin 7 to the tracing indicator or pointer 5 is effected by means of a two-armed lever 9 which is pivotally carried by a spindle 10 mounted on the camera housing 1. One arm 9a of the lever 9 engages the other end of the pin 7, and the other arm 9b engages an axially movable transmission pin 12 which is mounted for axial movement in a guide bushing 11. The pin 12 at its other end engages a toothed segment 13a which is pivotally mounted on a spindle 13 and meshes with a gear wheel 14 arranged on a shaft 15 connected with the pointer 5 to drive the latter. The toothed segment 13a is biased by a spring 16 in a counterclockwise direction, thereby tending to maintain the transmission pin 7 in continual engagement with the control cam 8, without looseness.

A well-known releasable coupling device is provided between the diaphragm and speed setting rings 3 and 4, to effect mutual and simultaneous shifting of said setting rings, said coupling device being not shown herein in detail since per se it forms no part of the present invention. The release of said coupling device is effected by means of a finger piece 17 which is mounted on the diaphragm setting ring 3 as shown. The connection between the setting rings 3 and 4 is made in a well-known manner so that when both rings are coupled and moved simultaneously no axial shifting of the transmission pin 7 takes place.

For the purpose of reading off diaphragm and speed values, scales 3a and 4a are provided on the setting rings 3 and 4, for cooperation with a fixed index mark 18 which is mounted on the camera. Also, for the purpose of focusing the camera a focus setting ring 20 having a scale 20a is provided on the intra-lens shutter assembly, the said scale being cooperable with a fixed index mark 21 which is carried at the front of the front plate 19 of the shutter. The front lens is mounted on the said focusing ring 20, as is well understood.

In accordance with the present invention, the exposure symbol scale 6 is mounted on the carrier ring 22 which latter, for the purpose of taking into consideration additional exposure factors as for example film speed and the like, is arranged rotatably and carries an additional setting scale 6a arranged to cooperate with a fixed setting or index mark 23. By the above organization the camera illustrated may have a large field of application, especially when using films of different speed, while at the same time a desirable simplicity is achieved, involving a relatively small expense and providing for ease of manufacture of the camera.

Instead of providing the second scale 6a on the carrier ring 22 to take care of exposure factors in addition to the intensity of illumination, provision could be made for the scale 6a at another place on the camera, preferably on the shutter, to coordinate the said factors; for example, the ring which supports the control cam 8 could be made settable or adjustable with respect to one of the setting rings 3 or 4 which arrangement is generally illustrated and described in my copending application Ser. No. 741,050, filed June 10, 1958, and entitled Photographic Camera With Coupled Exposure Meter. However, the present arrangement as illustrated in the embodiment of the invention set forth herein, for taking into consideration further or additional exposure factors, provides for a maximum clarity as well as a simple and uncomplicated handling of the camera, since the intra-lens shutter assembly is relieved, with regard to the matter of space and function, of the necessity for such additional setting means. Especially where the intra-lens shutter is not required to carry such auxiliary setting means there is eliminated special setting members and special adjusting and transmission mechanisms.

For the purpose of setting for film speeds or other exposure factors utilizing the second scale 6a which in accordance with the invention is mounted on the carrier ring 22, the well-known linear running graduation of the scales for exposure time and diaphragm is a prerequisite.

For the purpose of securing the carrier ring 22 in its different adjusted positions corresponding to the adjusted film-speed value, there is further provided a releasable locking device for fixing the ring in different adjusted positions.

Figure 2:
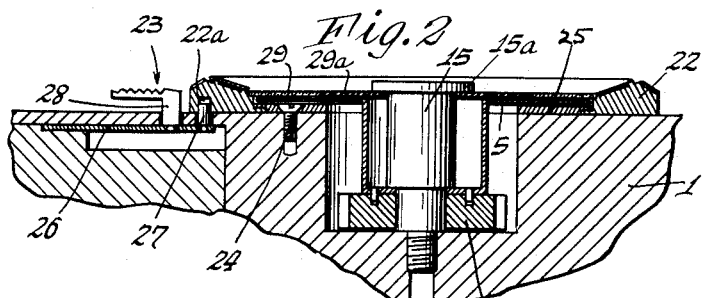
FIG. 2 is a cross section of the upper wall of the camera, showing the construction of the tracing member and the symbol scale which cooperates with it, and which is arranged on a carrier ring.

As seen in FIG. 2, the said locking device is preferably constituted as a series of notches and a cooperable stop, and may comprise a leaf spring 26 arranged to be mounted on the upper part of the camera and normally hidden from view. One end of the leaf spring 26 is fixedly attached to the camera housing 1, while the other free end carries a locking pin 27 which may be received in any one of a plurality of equi-distant notches 22a provided in the undersurface of the carrier ring 22. The distance between the notches 22 corresponds to the graduations on the film speed scale 6a, as will be understood.

For the purpose of actuating the above described locking device an additional finger piece or pin 28 is provided, mounted on the leaf spring 26. The pin 28 is disposed alongside and beyond the periphery of the carrier ring 22, projecting slightly from the upper wall of the camera as seen in FIG. 2. Preferably the fixed setting mark 23 is provided on the front or top surface of the actuating pin 28.

The above-described locking device has the advantage that the carrier ring 22 is at all times held securely against unintentional movement or dislodgement from its initially set or adjusted position as determined by the film characteristics. Moreover, the provision of the fixed setting or index mark 23 on the manually operable actuating member 28 of the locking device makes unnecessary additional parts or components and provides the maximum degree of simplicity with the greatest ease and convenience in effecting the desired adjustment.

For the purpose of securing the carrier ring 22 against axial movement a retainer or holding ring 25 is provided, said retainer ring being secured by means of screws 24 to the camera housing 1. The retainer ring 25 has a peripheral retaining flange 25a which is received in an annular groove provided at the inner periphery of the carrier ring 22, said groove being defined by an annular flange 22x on the carrier ring. The inner peripheral surface of the flange 22x of the carrier ring 22 engages an annular shoulder 25b of the retainer ring 25 for bearing purposes, as will be understood from an inspection of FIG. 3.

In order to simplify as much as possible the setting of the camera, in accordance with the invention, the indicator of the follow-up or transmission device, constituted as the pointer 5, has an arm 5a arranged to cooperate with the symbol scale 6 as already mentioned above. The indicator or pointer 5 is movable under a cover plate 29 which is preferably made of a transparent plastic composition, the said plate being so arranged that it covers over or closes the inside area of the carrier ring 22 and thereby provides a closed surface on the top wall of the camera so as to prevent access from the exterior. The cover plate 29 is advantageously carried by the carrier ring 22, as may be readily seen in FIG. 3. By the provision of the transparent cover plate 29 there is obtained the advantage that the camera housing 1 is closed, preventing the entrance of dust and other foreign matter, and securing a reliable operation of the indicator and the gear which drives it while at the same time there is obtained a perfect visibility of the indicator or pointer 5 throughout its movement.

In order to conceal or hide the drive mechanism of the indicator 5, the center circular portion 29a of the cover plate 29 is made opaque, as by providing a non-transparent coating or coloring. Further, the cover plate 29 may be provided with a central opening, to receive a fixed stud or bolt 15 having an end flange 15a overlying the cover plate, to further retain the latter in place.

As already mentioned above, the novel and improved indicator device as provided by the invention may be used in an advantageous manner to adjust the camera for daylight exposures as well as for exposures using flashbulbs and the like. For this purpose, in addition to the exposure value scale 6 there is provided an auxiliary focusing scale, which serves to indicate the proper diaphragm settings when making flashlight exposures. Further in accordance with the invention, the follow-up part or indicator 5 is constituted as a two-armed pointer, wherein the arm 5a thereof cooperates with the symbol scale 6 whereas the other indicator arm 5b cooperates with an auxiliary focusing scale indicated at 6b. Due to the construction of the pointer 5 wherein the arms 5a and 5b thereof extend in opposite direction, the symbol scale 6 and the auxiliary focusing scale 6b are arranged to be opposite each other as shown in FIGS. 1 and 4. It will be understood that other angular relationships between these two scales may be utilized, by a proper modification of the pointer 5 to change the angular positions of the parts 5a and 5b thereof. The angular disposition or spacing of the scales 6 and 6b, as well as the illustrated construction of the follow-up indicator or pointer 5 in the form of a two-armed member or lever results in a favorable and easy-to-read indicating means, enabling speed settings to be made by the use of exposure symbols and also enabling proper diaphragm settings to be made utilizing the auxiliary focusing scale 6b.

An advantageous arrangement of the auxiliary focusing scale 6b from the standpoint of its operation and use, which arrangement increases the field of application of the camera, resides in providing the said scale on a scale ring 30 which is arranged to be concentric with the carrier ring 22 having the exposure symbol scale, and which is further arranged to be relatively adjustable with respect to the said carrier ring, the latter and the scale ring being associated with a scale 31 having indications relating to types of flash lamps and a cooperable setting or index mark 32 for the said scale. Such arrangement enables simple and clear settings to be readily made, involving the illumination intensity of electronic flash devices and the like when it is desired to make flash exposures with the camera. Further, the said simple and clear readings are obtained without resorting to special devices or involving increased or special expense.

Figure 3:
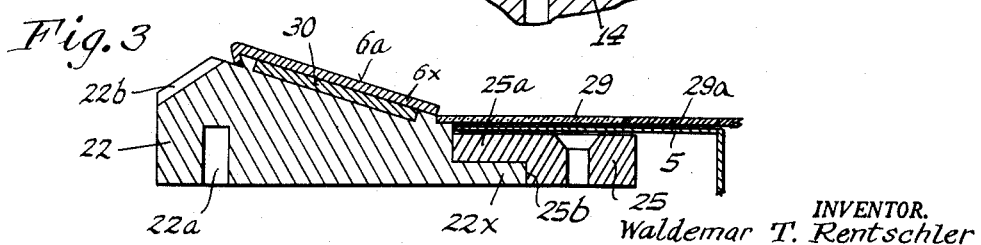
FIG. 3 is an enlarged fragmentary section of the carrier ring shown in FIG. 2, and of its radial and axial guide.

The scale ring 30 is not subjected to any forces other than those involved in adjusting it, and thus the said ring may be constituted of light or small gauge material which will require very little space on the carrier ring 22. For example, as shown in FIGS. 3 and 4 the scale ring 30 may be disposed in a shallow annular recess in the face of the carrier ring 22, and may be covered by the flat ring shown as having the symbol scale 6 and also the film speed scale 6a. The said flat ring is indicated by the numeral 6x in FIG. 3, said ring 6x being fixedly secured to the carrier ring 22. The scale having the flash lamp types, indicated by the numeral 31, is preferably arranged in an advantageous manner on the transparent cover plate 29 which encloses the interior area of the carrier ring 22, and the setting or index mark 32 which cooperates with the said scale is preferably arranged on the scale ring 30 which also carries the auxiliary focusing scale 6b.

By the above organization there is obtained an extremely simple and easily understood structure which may be fabricated at relatively little cost; also, the said advantageous structure has the additional feature that the setting or index mark 32 may be so arranged as to constitute a handle 33 for the purpose of enabling the scale ring 30 to be easily and quickly adjusted.

The auxiliary focusing scale 6b in the illustrated embodiment of the invention is executed for a film speed 17° DIN in accordance with well-known guide numbers (said guide numbers equaling the diaphragm number times the distance in meters).

In order to obtain an especially simple setting for use when flash exposures are to be made, the commercial marks of some flashlamps are utilized, as for example the marks XM 1, XM 5, PF 1, PF 5, etc., and these commercial marks are associated with the index numbers as well. By this arrangement it is not necessary to refer back to previously mentioned guide numbers in order to consider and properly adjust for the illumination intensity of the various lamps.

With a setting organization as above provided by the invention, a semi-automatic exposure setting for daylight exposures is made in the following manner:

The fingerpiece 28 is depressed to disengage the locking pin 27 from the associated notch or recess 22a of the carrier ring 22 and the said ring is now turned to bring the proper value of film speed on the scale 6a opposite to the index mark 23. It will be understood that this setting is required only when film of a different speed from that previously used is to be exposed in the camera.

The true exposure setting of the camera is now made by turning the diaphragm setting ring 3 and/or the speed setting ring 4 of the intra-lens assembly to the proper positions. Initially the driving or coupling connection which exisits between these rings must be released, by depressing the handle 17, as will be understood. A turning of only one of the two rings 3, 4 effects an axial shifting of the transmission pin 7 through the medium of the control cam 8, and axial movement of the transmission pin actuates the lever or bell crank 9, transmission pin 12 and gearing 13a, 14, thereby effecting an adjustment of the indicator or pointer 5. The diaphragm and/or speed setting rings are turned to an extent sufficient to bring the arm 5a of the pointer 5 into coincidence with the appropriate symbol on the scale 6, which indicates the existing light conditions.

After the operator has released the coupling member 17, thereby securing together the setting rings 3 and 4, the said rings may now be conjointly adjusted to effect a proper speed-aperture selection, and this will take place without involving any movement of the indicator 5 inasmuch as such conjoint positioning of the setting rings 3 and 4 will not effect any axial shifting whatsoever of the transmission pin 7.

The effecting of an adjustment to condition the camera for flash light exposures is carried out in a similar simple and readily understandable manner just as with the above-described procedure for effecting settings for daylight exposures.

If the type of film is not changed, the setting which is made for film speed or sensitivity as above explained remains unaltered. For X synchronization of the shutter, for example, a speed setting of 1/30 of a second may be chosen. Thereafter, by means of the handle 33 on the scale ring 30 the latter is turned or adjusted until the setting mark 32 thereof comes into coincidence with the proper trademark designation or flash lamp indicator number found on the flash lamp scale 31. Now, the diaphragm setting ring 3 may be adjusted to bring the indicator arm 5b into coincidence with the proper meter number on the scale 6b, as determined by the distance between the camera and the subject to be photographed. If, in the course of making flash exposures, a different film having another sensitivity is utilized, this new film speed is taken into consideration by readjustment using the film speed scale 6a. When doing this, the existing setting of the flash lamp type is not disturbed.

For the purpose of facilitating the adjustment of the carrier ring 22, a knurling or equivalent means 22b may be provided on the ring, as seen in FIG. 3 for example.

In the embodiment of the invention illustrated in FIGS. 5 to 9 a further construction and development of the invention is illustrated.

Referring to these figures, it will be noted that the exposure symbol scale 6 and the auxiliary focusing scale 6b are still carried by the carrier ring 22 and the scale ring 30 respectively, and there is further provided a cover device to be used in conjunction with such scales, said cover device being movable between two positions. In one position of the cover device it exposes the focusing scale 6b as shown in FIG. 5 and conceals the symbol scale 6, and in the other position of the cover as shown in FIG. 6 it exposes the symbol scale 6 and conceals the focusing scale 6b. The movable cover member is constituted advantageously as a cover flap 34 which is shiftable through an arc of 180° about an axis which is parallel with the plane of the top wall of the camera casing 1, and is virtually contained in said wall or closely juxtaposed thereto.

For the purpose of mounting the cover flap 34 there are provided two diametrically disposed bearings or pillow blocks 35, 36, these being fixed on the carrier ring 22 and accommodating spindles 37 and 38 carried by the cover flap. As shown, the cover flap 34 is in the form of a half circle, and manipulation of the flap between its two positions is facilitated by the provision of knurling 34a disposed along its curved edge, as shown in FIGS. 5 and 6.

In order to prevent unintentional or accidental movement of the cover flap 34, and in order that the operator may always have a clear and readily understandable concept as regards the functioning of the cover flap, there is further provided by the invention a coil spring biasing means adapted to act on the flap at all times. The said spring means normally yieldably holds the flap 34 in the position shown in FIG. 6, wherein it covers or conceals the focusing scale 6b. In order to retain the cover flap 34 in its opposite position, wherein it conceals the exposure symbol scale 6 there is provided a releasable locking device which is arranged to cooperate with the cover flap in conjunction with a control means or mechanism which latter is coupled to the speed setting ring 4 of the intra-lens shutter assembly. The said control means acts on the cover flap 34 in such a manner that the releasable locking device is only effective to hold the cover flap 34 in the FIG. 5 position, covering the exposure symbol scale 6, when the speed setting ring 4 is in the position providing for flash exposures of the camera, said position being preferably indicated by a special color on the speed setting ring.

In the illustrated embodiment of the invention the cover flap 34 is influenced by two coil springs 39, 40 which engage both the carrier ring 22 and the cover flap 34 at their ends. The springs 39, 40 may be advantageously carried by the spindles 37, 38 as shown. The locking of the cover flap 34 in the position of FIG. 5 wherein it conceals the exposure symbol scale 6 is effected by means of a locking device (FIG. 7) comprising mainly a flexible strip 41 which is mounted on the top wall of the camera casing 1. On the free end of the strip 41 a ratchet nose or cam-type detent 41a is provided, said detent being arranged to overlie the cover flap 34 and lock the same against the action of the springs 39, 40 as clearly seen in FIGS. 5 and 7. For the purpose of actuating the locking device, the upper surface or edge of the detent is provided with knurling 41b.

The control means or device which cooperates with the cover flap 34 as above mentioned and which is coupled with the speed setting ring 4 comprises, as shown in FIGS. 8 and 9, an abutment or blocking pin 43 which is axially shiftable in a direction generally vertical to the optical axis of the camera and lens assembly, said pin being biased in an upward direction as seen in these figures by a compression coil spring 42. Cooperable with the blocking pin 43 there is provided a locking plunger 45 which is axially movable in a direction generally parallel to the optical axis of the camera and shutter assembly and which is biased to the right as viewed in FIGS. 8 and 9 by a compression coil spring 44. On the locking plunger 45 there is an extension 45a arranged to be received in a groove or recess 4b which is provided in the rear surface of the speed setting ring 4. In the illustrated embodiment of the invention the recess 4b is coordinated to the setting position of 1/30 second, of the speed setting ring 4; that is, the recess is aligned with the extension 45b of the locking plunger when the ring 4 is set to the value of 1/30 of a second. This value is chosen since the intra-lens shutter assembly is supposed to be X-synchronized. On M-synchronization, however, a shorter exposure time such as "flash time" would be possible.

The control means or device as above set forth and provided by the invention operates in the following manner:

Considering first FIG. 6, if the cover flap 34 is swung upward about its pivotal axis as defined by the spindles 37, 38 against the action of the coil springs 39, 40, the flap may be swung through an arc of almost 180°. Just prior to completing the 180° arc the cover flap will engage the end or tip 43a of the blocking pin 43, which end as clearly shown in FIG. 8 projects from the top surface of the camera. At the time of such engagement the cover flap 34 will be virtually concealing the exposure symbol scale 6. As the cover flap 34 now completes its movement through the 180° arc it will depress the blocking pin 43 slightly, as shown in FIG. 9, whereupon the locking device 41 may become operative to lock the cover flap 34 in the position of FIG. 5, completely covering and concealing the exposure symbol scale 6. During the inward or depressing movement of the blocking pin 43 a camming surface 43b on the said pin will cam outward or forward the locking plunger 45; said camming surface 43b engages a sloping surface on the end 45b of the locking plunger. The outward or forward movement of the locking plunger 45 against the action of its spring 44 will cause the extension 45a thereof to be disposed in the groove or recess 4b which is provided in the speed setting ring 4, and by such action the speed setting ring will be locked in its position of X-synchronization or M-synchronization wherein the camera is adjusted for using flash bulbs.

When the locking device 41 is released, the springs 39 and 40 will snap the cover flap 34 from the position of FIG. 5 back to the position of FIG. 6, wherein the exposure symbol scale 6 is revealed for the taking of daylight pictures. Simultaneously with such action the control device comprising the blocking pin 43 will be reset, that is, the pin 43 will be returned to its fully projecting position as shown in FIG. 8 under the action of the spring 42, and the locking plunger 45 will be returned from left to right, to the FIGURE 8 position under the action of the spring 44. It will be further noted that should the speed setting ring 4 not be positioned for flash exposures, the locking pin 45 will be prevented from moving from right to left to the position of FIG. 9, and this will in turn prevent the blocking pin 43 from being depressed by the cover flap 34 whereupon the latter may not be fully swung through the entire 180° arc nor will it be in a position to render the locking device 41 operative. Thus, the cover flap 34 will not be retained in the position of FIG. 5 wherein the flash exposure scale 6b is revealed, and this will indicate to the operator that the speed setting ring 4 is not properly positioned for the taking of flash-exposure pictures.

In order that adjustment may be made for different films, having different speeds or sensitivities even when the cover flap 34 is disposed in the position of FIG. 5 revealing the scale 6b for the purpose of making flash exposures, a second film-speed scale 34b is provided on the cover flap as shown in FIG. 5, said scale corresponding with the first film-speed scale 6a shown in FIG. 4 and being cooperable with the fixed setting or index mark 23 to which the film-speed scale 6a is referred.

The present invention has utility in connection with all kinds of cameras. In each circumstance it combines the advantage of a simple, readily operated, clear and easily understandable exposure setting with the merits of absolute reliability of action and unlimited applicability; at the same time there is the further advantage that relatively little space is required, together with few components of inexpensive construction, resulting in economy in the manufacture of the camera. There is also the further feature, of special significance, that exposure settings may be made not only with daylight (pictures of duration) but also for flash exposures as well, and with both such circumstances adjustment may be readily made for different film speeds or sensitivities, with but a single setting operation.

I claim:

1. In a photographic camera of the type wherein the settings are referred to different exposure symbols, the combination of a movable setting member and means for effecting simultaneous speed and diaphragm adjustment in response to movement of said member; a movable tracing member movably carried by the camera body adjacent the surface thereof and visible from the exterior thereof; a control device comprising a follow-up type of transmission, connected between the setting member and tracing member to effect movement of the latter in response to actuation of the setting member; and a scale on the camera to which the tracing member may be referred, said scale consising of a number of exposure symbols; an auxiliary focussing scale on the camera in a location adjacent the symbol scale for cooperation with said tracing member in addition to the said symbol scale, said auxiliary focussing scale being organized for use alternately with the symbol scale while utilizing the same tracing member, and being viewable at the same time that the tracing member is viewed, for the purpose of effecting exposure settings for flash exposures, said tracing member having two arms, one arm cooperating with the symbol scale and the other arm cooperating with the focussing scale, said scales being disposed in different arcs.

2. In a photographic camera of the type wherein the settings are referred to different exposure symbols, the combination of a movable setting member and means for effecting simultaneous speed and diaphragm adjustment in response to movement of said member; a movable tracing member movably carried by the camera body adjacent the surface thereof and visible from the exterior thereof; a control device comprising a follow-up type of transmission, connected between the setting member and tracing member to effect movement of the latter in response to actuation of the setting member; and a scale on the camera to which the tracing member may be referred, said scale consisting of a number of exposure symbols; an auxiliary focussing scale on the camera in a location adjacent the symbol scale for cooperation with said tracing member in addition to the said symbol scale, said auxiliary focussing scale being organized for use alternately with the symbol scale while utilizing the same tracing member, and being viewable at the same time that the tracing member is viewed, for the purpose of effecting exposure settings for flash exposures; a scale ring concentric with the carrier ring and adjustable with respect thereto, said focussing scale being carried by the scale ring; and a scale and index means on the carrier ring and scale ring and comprising a flash lamp type scale and an index mark cooperable therewith; a transparent cover plate enclosing the interior of the ring and carrying the said flash lamp type scale, said scale ring carrying a handle by which it may be adjusted, said handle having the index mark cooperable with said scale.

3. In a photographic camera of the type wherein the settings are referred to different exposure symbols, the combination of a movable setting member and means for effecting simultaneous speed and diaphragm adjustment in response to movement of said member; a movable tracing member movably carried by the camera body adjacent the surface thereof and visible from the exterior thereof; a control device comprising a follow-up type of transmission, connected between the setting member and tracing member to effect movement of the latter in response to actuation of the setting member; and a scale on the camera to which the tracing member may be referred, said scale consisting of a number of exposure symbols; an auxiliary focussing scale on the camera in a location adjacent the symbol scale for cooperation with said tracing member in addition to the said symbol scale, said auxiliary focussing scale being organized for use alternately with the symbol scale while utilizing the same tracing member, and being viewable at the same time that the tracing member is viewed, for the purpose of effecting exposure settings for flash exposures; a movable cover associated with the exposure symbol scale and auxiliary focussing scale and movable between two positions in one of which the symbol scale is covered and in the other of which the focussing scale is covered.

4. The invention as defined in claim 3, in which the cover comprises a pivoted sector-shaped flap turnable through an arc of 180° said scales being disposed opposite each other to be alternatively covered by the flap.

5. The invention as defined in claim 4, in which there is a spring means biasing the sector-shaped flap to the position wherein it covers the focussing scale, in which there is a releasable locking means for holding the flap in position covering the exposure symbol scale, in which there is a speed-setting member for adjusting the camera for flash exposures, and in which there is a blocking control means enabling said flap to be locked by the locking means only when the speed-setting member is adjusted to provide for flash exposures.

6. The invention as defined in claim 5 in which the control means comprises a spring-charged blocking pin axially movable in a direction substantially at right angles to the optical axis of the camera, and comprises a spring-charged locking part movable substantially parallel to the optical axis, said speed-setting member having a groove receiving the locking part under the action of the spring thereof when the member is set for flash exposures, and said locking part controlling the positioning of the spring-charged pin for such setting of the member whereby the flap is enabled to be locked.

7. The invention as defined in claim 4, in which the cover flap is mounted on the said carrier ring and has a second setting scale similar to that arranged on the carrier ring, and in which there is a setting mark cooperable with said second setting scale and carried by the said carrier ring.

References Cited in the file of this patent

UNITED STATES PATENTS

| | | |
|---|---|---|
| 2,334,075 | Davenport | Nov. 9, 1943 |
| 2,373,391 | Green | Apr. 10, 1945 |
| 2,849,936 | Fahlenberg | Sept. 2, 1958 |
| 2,870,670 | Norwood | Jan. 27, 1959 |
| 2,879,702 | Gossen et al. | Mar. 31, 1959 |
| 2,887,026 | Rentschler | May 19, 1959 |

FOREIGN PATENTS

| | | |
|---|---|---|
| 1,083,260 | France | June 23, 1954 |
| 186,124 | Austria | July 10, 1956 |
| 1,021,703 | Germany | Dec. 27, 1957 |